(12) United States Patent
Zimmer

(10) Patent No.: US 9,443,290 B2
(45) Date of Patent: Sep. 13, 2016

(54) DEFRINGING RAW IMAGES

(71) Applicant: Apple Inc., Cupertino, CA (US)

(72) Inventor: Mark Zimmer, Aptos, CA (US)

(73) Assignee: Apple Inc., Cupertino, CA (US)

( * ) Notice: Subject to any disclaimer, the term of this patent is extended or adjusted under 35 U.S.C. 154(b) by 166 days.

(21) Appl. No.: 13/927,638

(22) Filed: Jun. 26, 2013

(65) Prior Publication Data

US 2014/0307963 A1    Oct. 16, 2014

Related U.S. Application Data

(60) Provisional application No. 61/812,150, filed on Apr. 15, 2013.

(51) Int. Cl.
| | |
|---|---|
| *G09G 5/02* | (2006.01) |
| *G06K 9/00* | (2006.01) |
| *G06T 5/00* | (2006.01) |
| *G06T 3/40* | (2006.01) |

(52) U.S. Cl.
CPC ............ *G06T 5/003* (2013.01); *G06T 3/4015* (2013.01); *G06T 2207/10024* (2013.01); *G06T 2207/20012* (2013.01)

(58) Field of Classification Search
None
See application file for complete search history.

(56) References Cited

U.S. PATENT DOCUMENTS

| | | | |
|---|---|---|---|
| 7,762,814 B2 | 7/2010 | vanderZel | |
| 7,835,569 B2 | 11/2010 | Marcu | |
| 7,893,975 B2 | 2/2011 | Zimmer | |
| 7,965,411 B2 | 6/2011 | Suzuki | |
| 2005/0135700 A1 | 6/2005 | Anderson | |
| 2010/0135588 A1* | 6/2010 | Au | G06T 3/403 382/243 |
| 2010/0272340 A1 | 10/2010 | Bar-Aviv | |
| 2011/0205227 A1 | 8/2011 | Fischer | |
| 2012/0051730 A1* | 3/2012 | Cote et al. | 396/90 |
| 2012/0082380 A1* | 4/2012 | Fujiwara et al. | 382/167 |
| 2014/0193069 A1* | 7/2014 | Kim et al. | 382/165 |
| 2014/0267839 A1 | 9/2014 | Nishimaki | |

* cited by examiner

*Primary Examiner* — Yingchun He
(74) *Attorney, Agent, or Firm* — Blank Rome LLP

(57) ABSTRACT

This disclosure pertains to novel devices, methods, and computer readable media for performing color defringing on image data. In photography, particularly RAW images, different artifacts can affect the quality of the edges of objects in the image. This effect is generally more noticeable when the edge has high contrast. One motivation for the described techniques is the understanding that, typically, not all pixels of an image exhibit color fringing. Usually, fringing only occurs in high-contrast edges. Mere masking of the effects of the whole-image operations can improve the result, but further improvements are still possible. This disclosure also pertains to novel devices and computer readable media for performing red-blue color reconstruction on data from a variety of color filter arrays (CFAs).

20 Claims, 12 Drawing Sheets
(6 of 12 Drawing Sheet(s) Filed in Color)

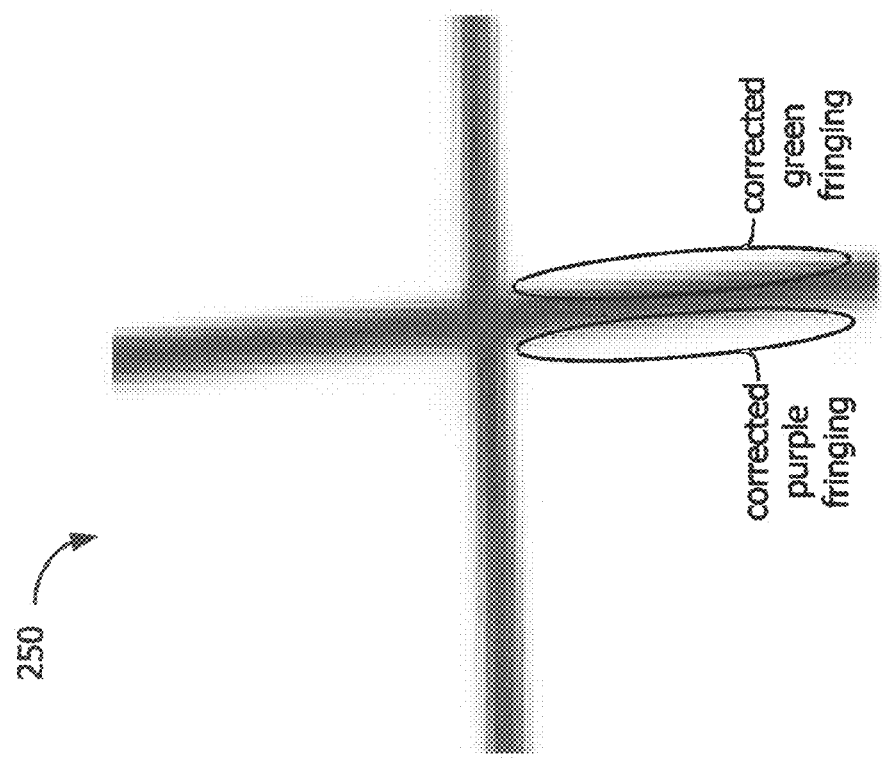
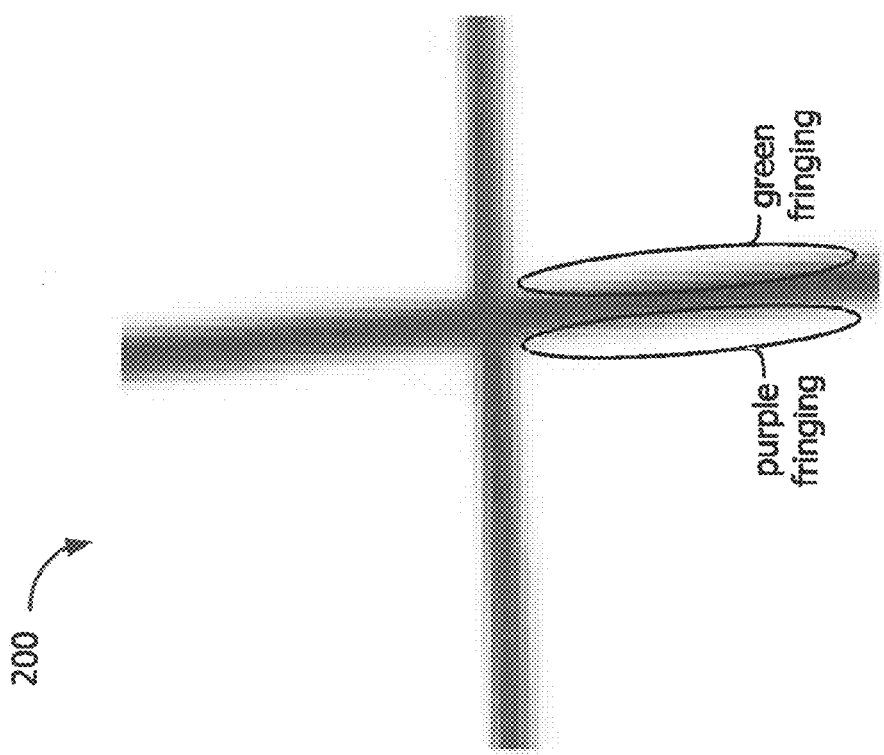

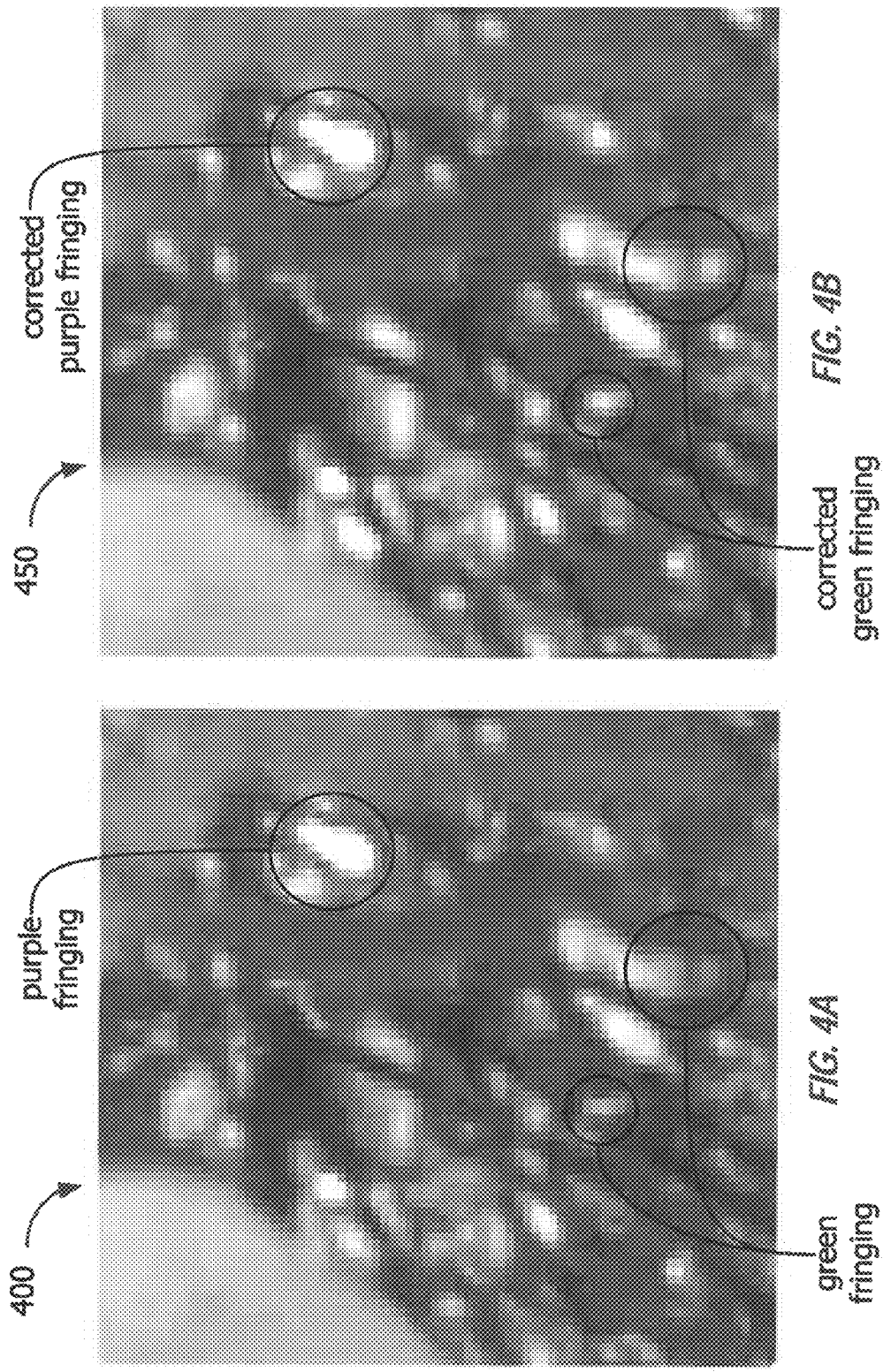

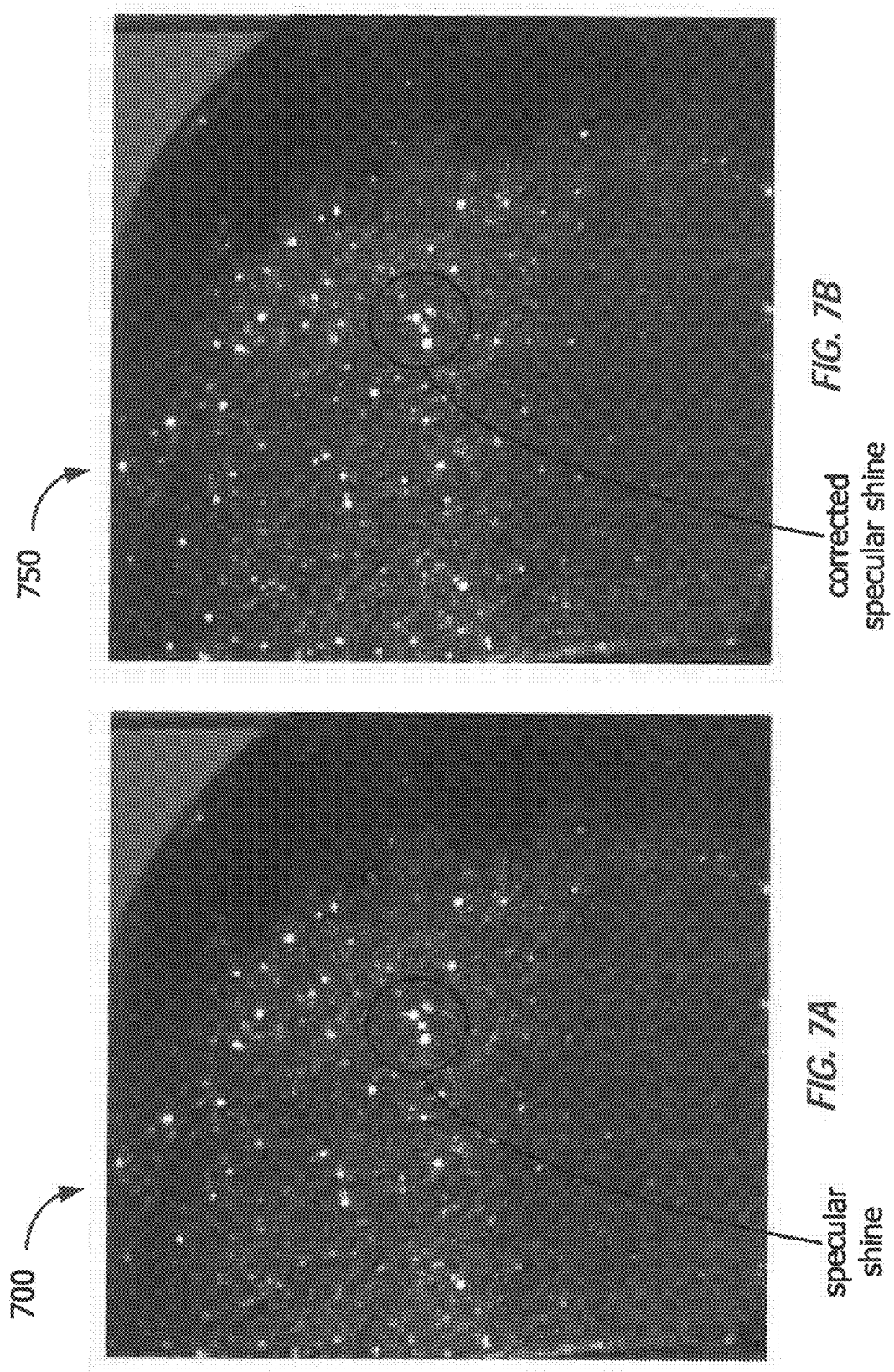
FIG. 7B corrected specular shine
FIG. 7A specular shine

DEFRINGING RAW IMAGES

CROSS-REFERENCE TO RELATED APPLICATION

This application claims priority to provisional U.S. Patent Application Ser. No. 61/812,150, filed Apr. 15, 2013 ("the '150 application"). The '150 application is hereby incorporated by reference in its entirety.

BACKGROUND

This disclosure relates generally to image processing techniques. More particularly, but not by way of limitation, it relates to novel techniques for performing image defringing, as well as red color channel and blue color channel reconstruction from a variety of color filter arrays (CFAs).

In photography, particularly RAW images, different artifacts can affect the quality of the edges of objects in the image. This effect is more noticeable when the edge has high contrast. In repairing such a color "fringe" region, it is often effective to merely diminish the noticeability of the fringe. This can be done through chroma replacement with nearby values, desaturation, and by other means.

Usual approaches to defringing involve chroma blur and chroma median filtering, which are operations that apply to the whole image. One motivation for improving upon these usual approaches is the understanding that, typically, not all pixels of an image display color fringing. Usually, fringing only occurs in high-contrast edges. Mere masking of the effects of the whole-image operations can improve the result, but further improvements are still possible. Further improvements are also possible to the process of reconstructing red and blue color channel information for CFAs, as typical demosaicing techniques may themselves introduce additional color fringing artifacts to the image.

SUMMARY

In one embodiment, a method to defringe RAW images is described. The method may comprise obtaining image data representative of a first image, the image data comprising a plurality of pixels, each pixel in the plurality comprising a first plurality of color values; obtaining a direction map for the first image, the direction map having a corresponding value for each pixel in the plurality; obtaining a gradient map for the first image, the gradient map having a corresponding value for each pixel in the plurality; determining color statistics for one or more pixels in the plurality, wherein determining the color statistics comprises analyzing a color value for each pixel in a neighborhood of pixels surrounding the pixel for which the color statistics are being determined; and updating the first plurality of color values for one or more pixels in the plurality, based at least in part on: the corresponding value in the direction map, the corresponding value in the gradient map, the first plurality of color values, and the determined color statistics for the pixel being updated. The method may be embodied in program code and stored on a non-transitory storage medium. The stored program code may be executed by a processor that is part of, or controls, a device having a memory, a display, and a processor coupled to the memory and the display.

In another embodiment, the method may comprise obtaining image data representative of a first image, the image data comprising a plurality of pixels, each pixel in the plurality comprising a first plurality of color values; obtaining a direction map for the first image, the direction map having a corresponding value for each pixel in the plurality; and obtaining a gradient map for the first image, the gradient map having a corresponding value for each pixel in the plurality. Then, for each pixel in the plurality, the method may: determine whether the corresponding gradient map value for the pixel exceeds a gradient threshold; and, if the gradient map value for the pixel exceeds the gradient threshold: determine color statistics for each pixel in a neighborhood of pixels surrounding the pixel; determine, based at least in part on the determined color statistics, an edge case for the pixel; determine, based at least in part on the determined edge case, the determined color statistics, and the first plurality of color values for the pixel, a plurality of new color values for the pixel; update the plurality of color values of the pixel to be equal to the plurality of determined new color values; and store the pixel having the plurality of updated colors in a memory. If instead, the gradient map value for the pixel does not exceed the gradient threshold the pixel may simply be stored unchanged in memory. As will be understood, the plurality of pixels that are stored in the memory comprise a second image that has been processed to remove color fringing and that corresponds to the first image. The method may be embodied in program code and stored on a non-transitory storage medium. The stored program code may be executed by a processor that is part of, or controls, a device having a memory, a display, and a processor coupled to the memory and the display.

In still another embodiment, a method to reconstruct red and blue color information from a CFA is described. The method may comprise obtaining image data representative of a first image, the image data comprising color filter array (CFA)-ordered RAW bitmap data; obtaining reconstructed green channel information for the first image; obtaining a direction map for the first image, the direction map having a corresponding value for each pixel in the plurality; obtaining a gradient map for the first image, the gradient map having a corresponding value for each pixel in the plurality; and for each non-blue (or non-red) photosite represented in the image data, reconstruct a blue (or red) value for the photosite by performing instructions to cause the processor to: determine whether the corresponding gradient map value for the photosite exceeds a gradient threshold; and, when the corresponding gradient map value for the photosite exceeds the gradient threshold, determine a blue (or red) value for the photosite by causing the processor to perform instructions comprising: interpolating between the blue (or red) values of neighboring blue (or red) photosites of the photosite for which the blue (or red) value is being reconstructed; and determining, for the photosite for which the blue (or red) value is being reconstructed, a linear regression between each of a plurality of local blue (or red) photosites and their co-located green samples from the reconstructed green channel information. When the corresponding gradient map value for the photosite does not exceed the gradient threshold, the method may instead determine a blue (or red) value for the photosite by causing the processor to perform instructions comprising: interpolating between the blue (or red) values of neighboring blue (or red) photosites of the photosite for which the blue (or red) value is being reconstructed. The method may be embodied in program code and stored on a non-transitory storage medium. The stored program code may be executed by a processor that is part of, or controls, a device having a memory, a display, and a processor coupled to the memory and the display.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2A and 2B are examples of an image before and after lateral CA has been corrected.

FIGS. 4A and 4B are examples of an image before and after axial CA has been corrected.

FIGS. 7A and 7B are examples of an image before and after specular shine-related fringing has been corrected.

DETAILED DESCRIPTION

Figure 1:
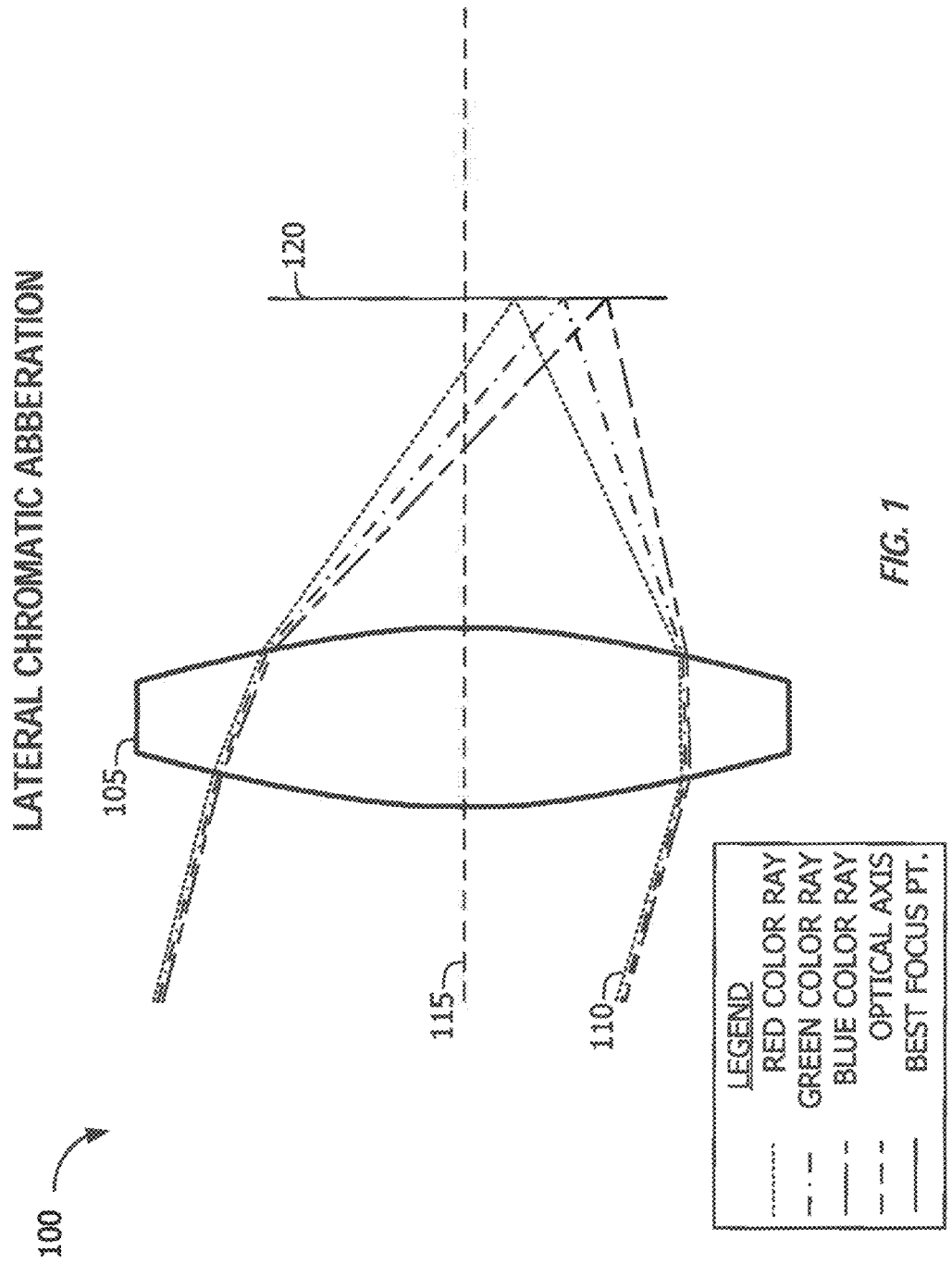
FIG. 1 is a diagram depicting an example of lateral chromatic aberration.

This disclosure pertains to systems, methods, and computer readable media for image processing. In general, techniques are disclosed for performing color defringing on RAW image data. This disclosure also pertains to systems, methods, and computer readable media for performing red-blue color reconstruction from a variety of color filter arrays (CFAs).

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the art of electronic device operations having the benefit of this disclosure.

Often, color fringing is confused with color noise. Color fringes are, in fact, distinct and come from completely different sources than color noises. More specifically, color fringe artifacts can come from various sources, but the primary causes are the various forms of chromatic aberration (CA). It is also possible for the demosaicing process to introduce color fringing. Color noise, on the other hand, arises from the random arrival time of photons to the image sensor, from the process of reading out the pixels from the image sensor, and from the imprecision in the manufacture of the image sensor.

Lateral CA

It is possible to approximately cancel lateral CA by characterizing the lens and paying attention to the metadata concerning the lens settings. However, algorithms to cancel lateral CA are imperfect. Techniques used for canceling lateral CA will now be discussed in further detail. Normally, owing to the fact that most image sensors have a greater number of green photosites than either red or blue photosites, and owing to the fact that the green channel is the best approximating channel to the luminance of the color, the green channel from the image data represents the true position of the edges, and the red and blue channels are shifted so the red and blue edges more closely match the green edges. To accomplish these shifts, small vectors of distortion are evaluated for each pixel that give the shift of red and the shift of blue. Then, the red and blue data is interpolated to produce the red and blue color at the pixel. This interpolation introduces some softening in the red and blue channels. This softening can cause color fringing on high-contrast edges.

FIG. 1 shows an example of lateral chromatic aberration 100. Incoming light rays 110 enter convex lens 105, as shown in FIG. 1. The various red, green, and blue components of incoming light ray 110 are shown in the LEGEND of FIG. 1. As shown in FIG. 1, the best focus point 120 in this example of lateral CA occurs below the optical axis 115 of lens 105. At the best focus point 120, the red, green, and blue color rays have separated from each other, resulting in lateral CA. While lateral CA is most visible towards the edges and corners of an image, axial CA can occur in any area where there is an edge across which a large depth difference occurs. Almost all CA is only visible on high-contrast edges. With lateral CA, often one side of an object has a different color fringe from the other side. With Axial CA, the color of the fringe is dependent primarily upon the dark side of the edge and its relation to the plane of optimal focus.

FIGS. 2A and 2B are examples of lateral CA. FIG. 2A is the original image 200 after demosaicing with no CA correction. FIG. 2B is the image 250 after demosaicing with CA correction. Exemplary areas of corrected purple and green fringing are shown in FIGS. 2A and 2B.

Axial CA

Axial CA causes bright highlights to have purple or green fringes, depending upon on which side of the focal plane the object is in focus. This means an effective defringing process needs to be able to handle both cases. This problem cannot be geometrically cancelled like lateral CA because it depends upon the distance to the objects in the scene.

Figure 3:
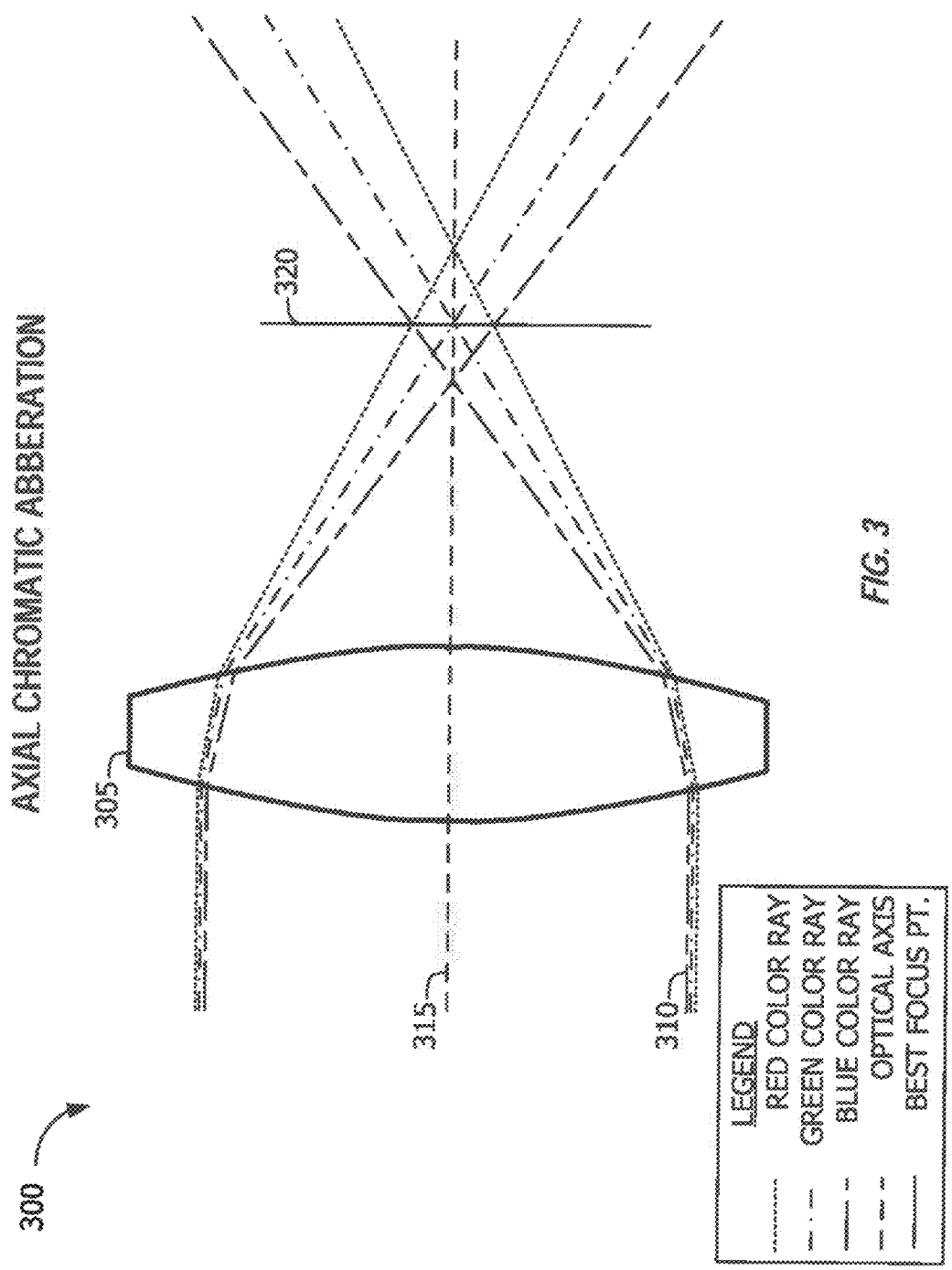
FIG. 3 is a diagram depicting an example of axial chromatic aberration.

As shown in FIG. 3, axial CA 300 occurs when different wavelengths of colors of incoming light rays 310 do not converge at the same point after passing through a lens 305 having optical axis 315. The various red, green, and blue components of incoming light ray 310 are shown in the LEGEND of FIG. 3. As shown in FIG. 3, the different colors of incoming light rays converge at different points along the plane positioned at the best focus point 320, resulting in axial CA.

FIGS. 4A and 4B are examples of axial CA. FIG. 4A is the original image 400 after demosaicing with no CA correction, causing green, cyan, and purple fringes. FIG. 4B is the image 450 after demosaicing with defringing to correct for the axial CA. Exemplary areas of corrected purple and green fringing are shown in FIGS. 4A and 4B.

The Color Filter Array

As mentioned above, the demosaicing of the color filter array (CFA) is a source of fringing artifacts in and of itself. In a standard Bayer CFA, red and blue both have a base wavelength that is larger than the base wavelength of green by a factor of the square root of 2 (i.e., ~1.41×). This means that most interpolation artifacts (i.e., from determining the missing pixels) will be larger by that same factor. This is most noticeable in bright lights. In another common CFA, the Fuji X-trans CFA, both the red and blue channels have a base wavelength that is approximately twice that of the base wavelength of green, making the problem even worse than with a Bayer CFA.

Figure 5B:
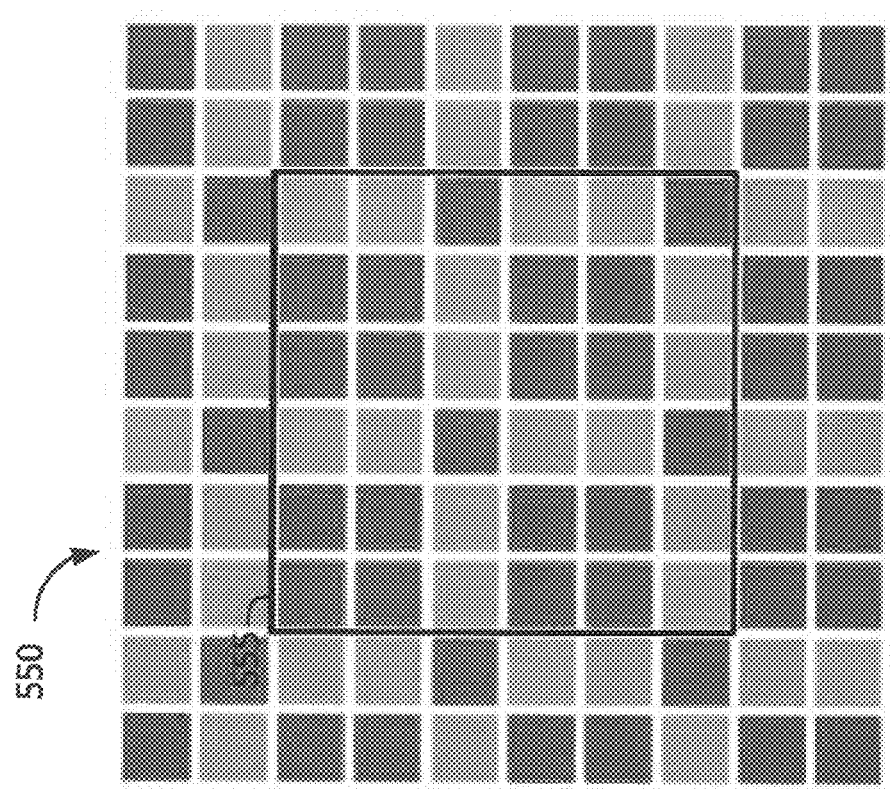
FIG. 5B illustrates an exemplary Fuji X-trans CFA.
Figure 5A:
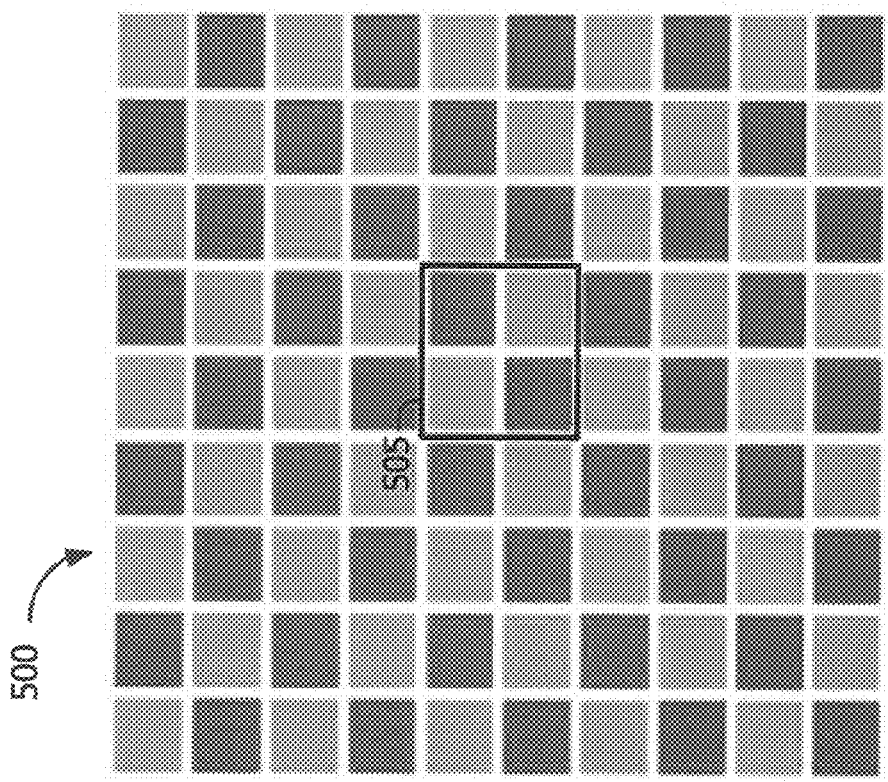
FIG. 5A illustrates an exemplary Bayer CFA.

FIG. 5A shows a diagram representative the Bayer CFA 500, and FIG. 5B shows a diagram representative of the Fuji X-trans CFA 550. In the Bayer CFA 500, the repeated block is surrounded by a square 505, while in Fuji X-trans CFA 550, the repeated block is surrounded by a square 555.

When interpolating the red and blue channels from the Fuji X-trans CFA, the positions of the red and blue pixels are less regular and are spread farther apart, so the interpolation is considerably softer. Alternatively, the green pixels are more numerous and, in general, closer together, thus making the green interpolation much sharper than with the Bayer CFA.

Figures 6A, 6B:
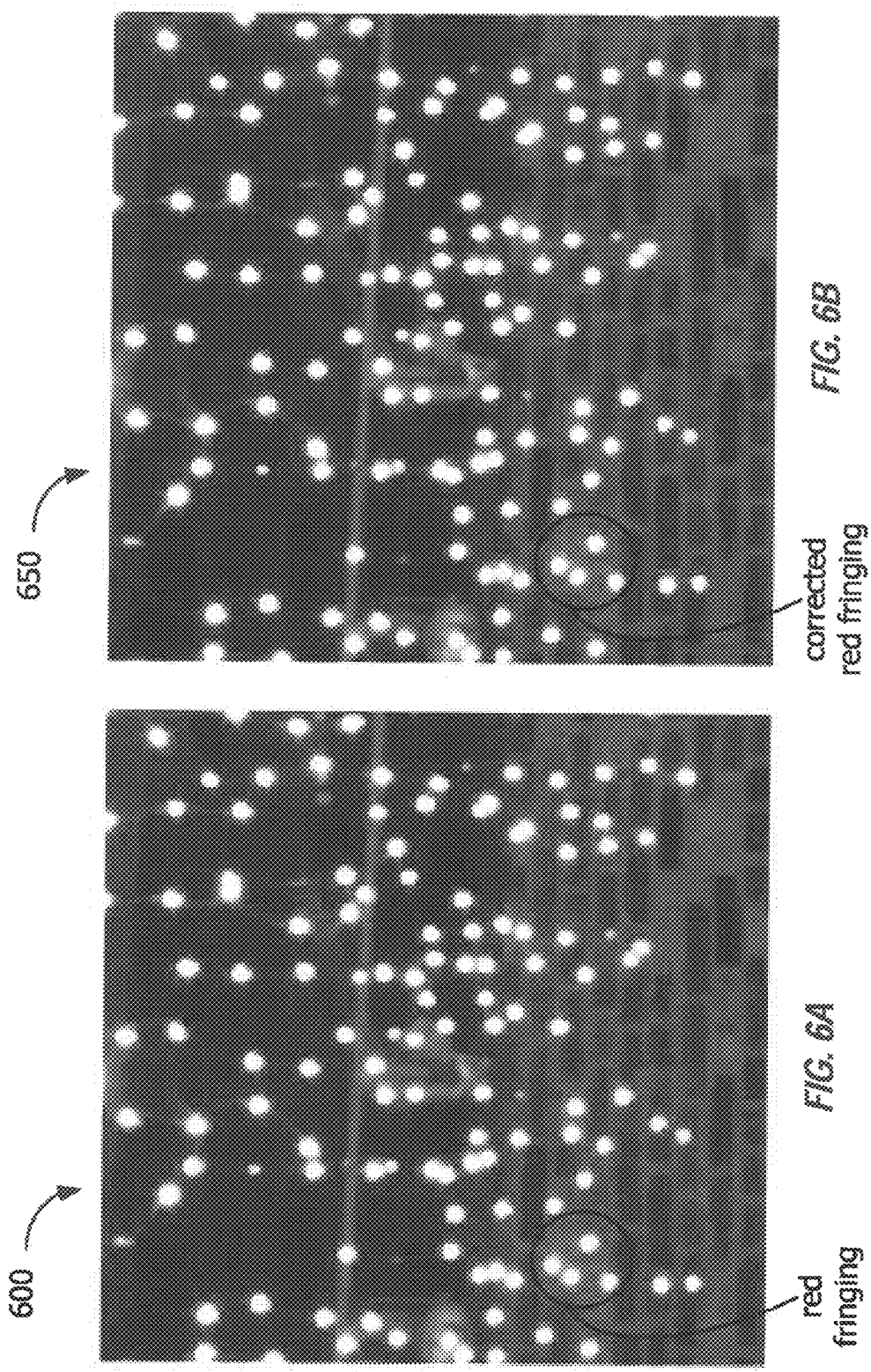
FIGS. 6A and 6B are examples of an image before and after red fringing has been corrected.

FIGS. 6A and 6B show a before image 600 and an after image 650, respectively, of some bright lights. Exemplary areas of red fringe and a repair of the exemplary red fringe are labeled on the figures. The image shown in FIGS. 6A and 6B was taken from a Fuji X-Pro 1 camera with a Fuji X-trans sensor. In the Fuji sensor, because the red interpolation is much softer and the green interpolation is much sharper, the result is that a red fringe appears on bright lights, with extreme contrast gradients.

Demosaicing

Color fringes may result from the demosaicing process because high-frequency detail may alias with color differences in imagery captured using a CFA. This effect is fairly easily cancelled in Bayer CFAs because knowledge of how the color shifts appear in high-frequency scene data may be leveraged in the cancellation process. With other CFAs, such as the Fuji X-trans CFA, it is much more difficult to predict the color shifts. Moreover, when a camera lacks an anti-aliasing filter (as with the Fuji X-Pro 1), the problem is made more severe because of aliasing artifacts. While the sensor's pattern does make aliasing artifacts less common, there are still plenty of cases where aliasing can occur. It is also possible to have a specular shine fall primarily on a red, green, or blue pixel in the CFA, which can give the specular shine a color cast.

FIGS. 7A and 7B show a before image 700 and an after image 750, respectively, of an image with specular shines from a glittery material that was taken from a Fuji X-Pro 1 camera with an X-trans sensor. The defringing process results in a significant reduction of the colorfulness of the specular shines. Exemplary areas of corrected specular shine color fringing are shown in FIGS. 7A and 7B.

Defringing Algorithm

The description of the defringing algorithm that follows is but one exemplary embodiment of a process for performing color defringing on RAW image data and is presented for illustrative purposes. The full scope of the invention herein is limited only by the language of the claims.

The defringing algorithm, in accordance with the exemplary embodiment being described herein, operates on a fully demosaiced linear RGB image. The defringing process described herein is intended to operate on image data that has already been white-balanced. The process begins by examining a small neighborhood of pixels around the pixel currently being processed. For example, the reach can be as much as four pixels in any direction.

This defringing algorithm can be easily rewritten for a color image that is not linear (for instance, gamma-corrected). In this case, the steps of each component are more perceptually-spaced. In this case, it is usual to replace the ratios between color components with differences (for instance, r/g is replaced with r−g, so desaturating by interpolating towards 1 is replaced with desaturating by interpolating towards 0, and so forth, as will be described in further detail below).

Direction Map and Gradient Map

Before the defringing algorithm is run, it is assumed that the direction map and the gradient map are completely evaluated and available for the image being processed. Further details on the construction of the direction map may be found in commonly-assigned and commonly-invented U.S. Patent Publication No. 2011-0052091 A1, which is hereby incorporated by reference in its entirety (hereinafter, "the '091 Publication").

Additional resources are useful to have when accomplishing this defringing operation. In particular, a direction map is useful. In an exemplary direction map, each pixel may have a value of 0, 1, 2, or 3 (called the predominant edge direction), indicating that a pixel is at or near an edge that is: horizontal (0), on a rising diagonal (1), vertical (2), or on a falling diagonal (3), respectively. A gradient map is useful as well. For the gradient map, each pixel is evaluated from the reconstructed green map. At a pixel, the 3×3 neighborhood centered on the pixel is sampled, and a green range is evaluated composed of the maximum of the 9 samples in the 3×3 neighborhood minus the minimum of the 9 samples in the 3×3. The gradient value of the pixel is then calculated by taking the square of the green range and dividing it by a softened green average, also derived from the 9 samples in the 3×3. Exemplary techniques for computing a softened average may also be found in the aforementioned '091 Publication.

Normally, within the green channel of an image (or any scalar map of the image, for that matter) the gradient is a vector pointing "up." In our case, the gradient map is more closely analogous to the gradient-magnitude, and the direction map is akin to the normalized gradient direction, quantized into a fixed number of discrete values.

The values in the gradient map are intended to be used like gradient-magnitude values. They are computed specifically for linear images so that a single threshold can be used to determine when an edge feature is "just above the noise." In a non-linear image (one that has perceptual spacing), the noise levels are approximately at a fixed level across the entire tonal range. So, in the gamma-corrected image case, it is appropriate to store the green range in the gradient map directly.

It is beneficial for the defringing algorithm to have access to the direction map because it tells the algorithm in which primary direction the edge is traveling. Once the edge direction at the pixel is known, it is actually the direction perpendicular to the edge direction that gets used by the algorithm. This allows the algorithm to examine samples to either side of the edge.

Gradient Test

Before proceeding further with the defringing process, the algorithm conducts a preliminary gradient test centered on each pixel. In one embodiment, the gradient test comprises loading five pixels of gradient samples (g1, g2, g3, g4, and g5) that are centered on the pixel and situated on a line that is perpendicular (or approximately perpendicular, given the limitations of working in a two-dimensional array of pixels) to the predominant edge direction. The maximum value, GMAX, of these five samples may then be computed, and will serve as an indication of the maximum edge contrast near the pixel. If GMAX is less than a predetermined threshold, GT, then the pixel is left alone. GT may be determined based on the amount of noise in the image (and can also be dependent upon the number of bits used to retain a RAW pixel value). Here is the pseudocode for this step:

```
GMAX = max(g1, g2, g3, g4, g5);
if (GMAX < GT)
    leave the pixel unaffected;
```

If a pixel passes the gradient test, then it is a likely candidate to be processed and modified by this algorithm.

At this point, the algorithm may then compute a quantity that will be referred to herein as, DFRAC, which stands for "defringing fraction." DFRAC is a quantity that is used to provide a soft application edge to the defringing operation. Without a soft edge, the results of defringing may appear harsh, so every opportunity to soften the edge of the operation is potentially beneficial. At a DFRAC value of 0.0, the defringing operation is not applied, and the original color pixel is output. At a DFRAC value of 1.0, the defringing operation is fully applied. DFRAC can take on values in between 0.0 and 1.0, and it is intended that the operation effect increases linearly with DFRAC, although non-linear relationships are also possible in some embodiments. Immediately after the gradient test, DFRAC may be initialized in this manner:

$DFRAC=\text{clamp}((GMAX-GT)/(GT2-GT))$;

As a result of this, DFRAC approaches zero linearly and achieves a zero value at GT, the gradient map threshold. Since the computation is linear, DFRAC rises linearly until it reaches a value of 1 at GT2. The clamp( ) function takes an arbitrary real value and dips it to the range [0 . . . 1].

Load Neighborhood, Compute Color Statistics and Edge Case

If a pixel passes the gradient test, it is likely that the pixel is near a high-contrast edge and that further processing is warranted. At this point, nine colors may be loaded into arrays which will be referred to herein as: rs[1] . . . rs[9], gs[1] . . . gs[9], and bs[1] . . . bs[9]. These colors are centered on the pixel being evaluated and are taken from the line that is perpendicular to the predominant edge direction at the pixel.

Figure 8:
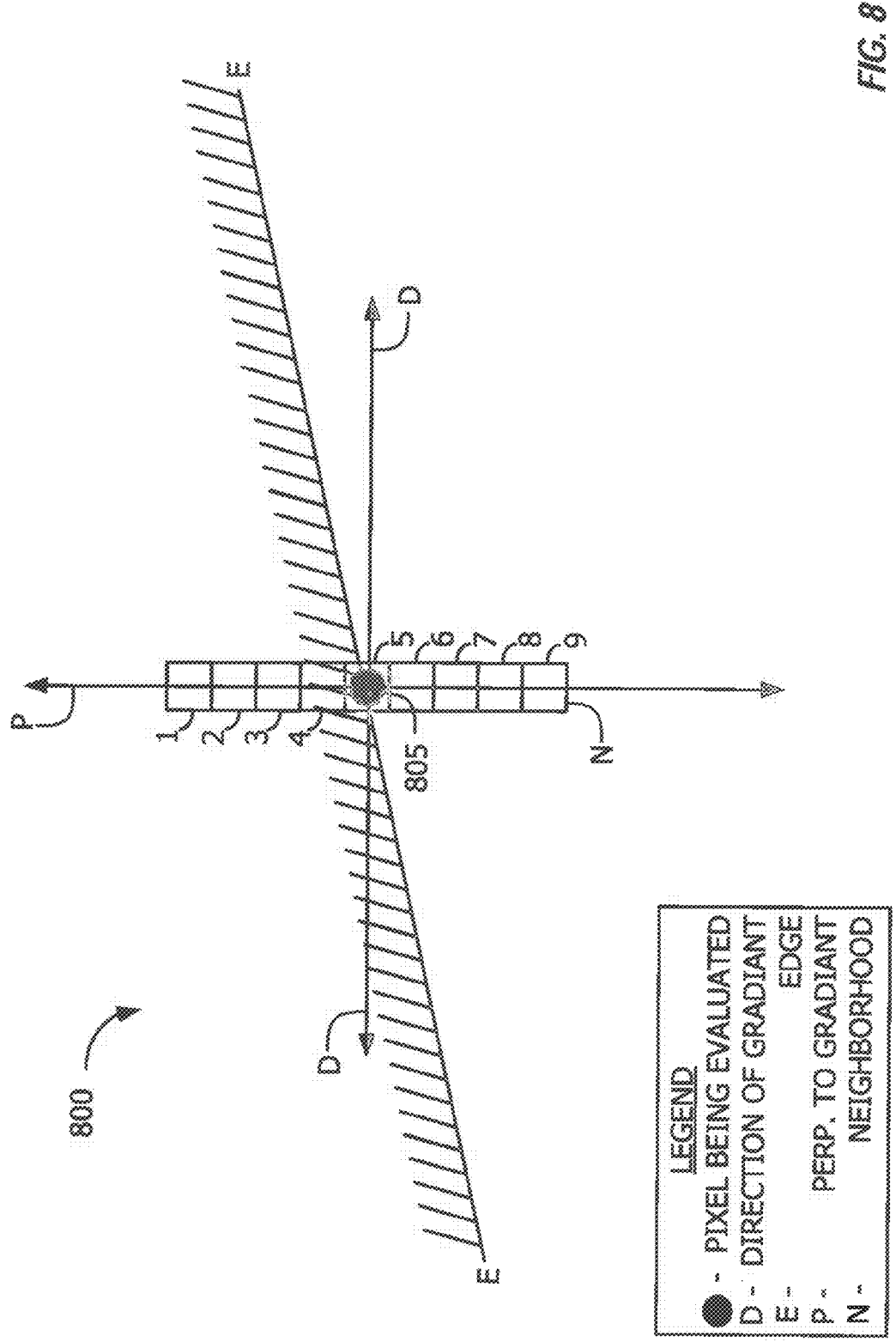
FIG. 8 is a diagram depicting an example of an edge pixel, an edge, an edge direction, and the edge pixel's neighborhood.

FIG. 8 is a diagram 800 depicting an example of a pixel 805 that is being evaluated and that is located on a near-horizontal edge, E. The predominant edge direction, D, in this example is horizontal (recall that the horizontal direction was assigned a value '0' in the direction map). The perpendicular edge direction, P, is vertical (recall that the vertical direction was assigned a value '2' in the direction map). The 9-pixel neighborhood, N, loaded along direction P is labeled with an 'N' in FIG. 8, and the individual pixel indices of the pixels comprising neighborhood N are labeled 1-9. The various symbols and letters used in FIG. 8 are explained in the legend located in FIG. 8. Although the center pixel, 5, of the neighborhood, N, is shown to be on the edge, E, in diagram 800, it could be located anywhere near the edge, potentially causing different "phases" in the neighborhood. For example, some center pixels, i.e., pixels with index 5, could actually be "above" the edge, and some could be "below" the edge, for a given edge. So, within the neighborhood, N, the pixel being examined is said to be at a different phase with respect to the edge (i.e., the actual edge can occur before or after the pixel being examined, depending upon which side of the edge the pixel being examined is located). In fact, all pixels near the edge that pass the gradient test may be processed in this way.

In order to compute the relevant color states and determine the so-called "edge case" of the pixel being processed, first, the minimum and maximum values of each color component in the nine-pixel set are evaluated and stored in variables which will be referred to herein as: rlo, rhi, glo, ghi, blo, and bhi.

The nine colors are predominantly categorized by their green component because that is the main component affecting color luminance. Next, a threshold, t2, is evaluated:

$t2=\text{pow}(glo*ghi*ghi, \frac{1}{3})$;

and this threshold is used to separate the nine colors into high and low colors. Essentially, if gs[i]<t2, then color i is low, otherwise it is high.

For each color, the r/g and b/g ratios, low and high color averages, and HRG and HBG, the red-green and blue-green ratio averages in the high pixels are evaluated. Here is the pseudocode for this:

```
hrsum = hgsum = hbsum = 0;
lrsum = lgsum = lbsum = 0;
hcnt = lcnt = 0;
hrgsum = hbgsum = 0;
for (i = 1 up to and including 9)
{
    rgr[i] = rs[i] / max(gs[i], 1);
    bgr[i] = bs[i] / max(gs[i], 1);
    if (gs[i] < t2)
    {
        lrsum += rs[i];
        lgsum += gs[i];
        lbsum += bs[i];
        lcnt++;
    }
    else
    {
        hrsum += rs[i];
        hgsum += gs[i];
        hbsum += bs[i];
        hrgsum += rgr[i];
        hbgsum += bgr[i];
        hcnt++;
    }
}
lravg = lrsum / max(lcnt, 1);
lgavg = lgsum / max(lcnt, 1);
lbavg = lbsum / max(lcnt, 1);
hravg = hrsum / max(hcnt, 1);
hgavg = hgsum / max(hcnt, 1);
hbavg = hbsum / max(hcnt, 1);
HRG = hrgsum / max(hcnt, 1);
HBG = hbgsum / max(hcnt, 1);
```

Four edge cases may also be discerned at this stage of the algorithm. Here is pseudocode for this:

```
    last = -1;
    edgecase = none;
    for (i = 1 up to and including 9)
    {
      current = gs[i] > = t2; // 0 == low, 1 == high
      if (last != -1 && last != current)
      {
        if (edgecase == none)
        {
          if (last == 1)
          {
            edge1 = i;
            edgecase = clear edge down;
          }
          else if (current == 1)
          {
            edge1 = i - 1;
            edgecase = clear edge up;
          }
        }
        else if (edgecase == dear edge down or edgecase == clear
    edge
        up)
        {
          if (last == 1)
          {
            edge2 = i;
            edgecase = notch up;
          }
          else if (current == 1)
          {
             edge2 = i - 1;
             edgecase = notch down;
          }
        }
      }
      last = current;
    }
```

The following TABLE 1 provides some examples of various samples 1 through 9, representing the nine sample neighborhood (and reflecting the values of gs[1] through gs[9]), falling into one of the four defined "edge cases." TABLE 1 shows examples of nine-pixel neighborhoods that would fall into each edge case and how the sample pixels might be marked (i.e., "high" or "low"). TABLE 1 also shows the positions of "edge1" and "edge2" within the pixel neighborhood after the edge case discernment processing has been completed.

TABLE 1

| notch down | notch up | clear edge up | clear edge down |
|---|---|---|---|
| 1 high | 1 low | 1 low | 1 high |
| 2 high | 2 low <-- edge1 | 2 low | 2 high |
| 3 high | 3 high | 3 low | 3 high |
| 4 low <-- edge1 | 4 high | 4 low | 4 high |
| 5 low | 5 high | 5 low <-- edge1 | 5 low <-- edge1 |
| 6 low | 6 high | 6 high | 6 low |
| 7 low <-- edge2 | 7 low <-- edge2 | 7 high | 7 low |
| 8 high | 8 low | 8 high | 8 low |
| 9 high | 9 low | 9 high | 9 low |

These examples shown in TABLE 1 are intended for exemplary purposes only. The actual positions of edge1 and edge2 can vary according to the pixel's relationship with, and position with respect to, the edge.

The edge locations are determined to lie on the first pixel outside the "high area." The actual edge case is computed based on the crossings from high to low or low to high. In the rare case where there are more crossings, the case is resolved to one of the existing four edge cases in some predetermined manner, possibly by ignoring the additional crossings.

Edge Case Processing

Once the edge case is resolved, each pixel that is processed falls into one of the four cases. Each case gets its own processing, and each case has unique processing characteristics.

The first task in one edge case is to decide whether or not the pixel is affected at all in that specific edge case. If it is not affected, the pixel is left alone. The second task in one edge case is to compute the color ratios, RGR and BGR, that define the new ratios for the pixel. The third task in one edge case is to ramp down the effect of the operation in some areas of contrast and color. As discussed above, the result of the ramping is a fraction, DFRAC, that is 1.0 for a fully color-modifying operation and 0.0 for an operation that leaves color alone entirely. DFRAC will take on values in between as well, for a softly-varying result.

Notch Up Case

The notch up case consists of a neighborhood of pixels that are high in the middle and low at the periphery. This is typically a specular shine or a small light. Fixing this case comprises desaturating the pixels in the affected region that consists of the high pixels and also a 1-pixel fringe around the highs. This means that all pixels from index edge1 up to and including edge2 get processed. If the center pixel (index 5) is not on this range, then the pixel is unaffected. The pseudocode for this is as follows:

```
if (edge1 > 5 or edge2 < 5)
    leave the pixel unaffected;
```

To decide the new ratios for the pixel, the average of all ratios outside the affected region is computed and stored in variables ORGR and OBGR. If there are no pixels outside the affected region, then the pixel is left alone. The average of the red-green and blue-green ratios inside the affected region are also calculated and stored in variables IRGR and IBGR. The ratios RGR and BGR are computed by desaturating ORGR and OBGR. In the high pixels (i.e., at locations edge1+1 up to and including edge2−1), the ratios are desaturated by moving the ratios one half the way towards 1.0. In the edge pixels (i.e., at locations edge1 and edge2) the ratios are desaturated by moving the ratios one quarter the way towards 1.0. The pseudocode for this is as follows:

```
rsum = bsum = 0; count = 0;
for (i = 1 up to and including edge1−1)
{
    rsum += rgr[i];
    bsum += bgr[i];
    count++;
}
```

-continued

```
        for (i = edge2+1 up to and including 9)
        {
            rsum += rgr[i];
            bsum +=bgr[i];
            count++;
        }
        if (count == 0)
            leave the pixel unaffected;
        ORGR = rsum / count;
        OBGR = bsum / count;
        rsum = bsum = 0; count = 0;
        for (i = edge1 up to and including edge2)
        {
            rsum += rgr[i];
            bsum += bgr[i];
            count++;
        }
        IRGR = rsum / count;
        IBGR = bsum / count;
        if (edge1 == 5 or edge2 == 5)
            desat = 0.25;
        else
            desat = 0.5;
        RGR = ORGR + (1.0 - ORGR) * desat;
        BGR = OBGR + (1.0 - OBGR) * desat;
```

In the notch up case, the BGR value may then be adjusted towards 1.0 to avoid "super-blue" cases that occur in edges with extreme contrast ratios. In general, this only occurs when the green contrast ratio within the neighborhood exceeds 5.0 and BGR exceeds 1.2. Here is the pseudocode for this:

```
        frac = clamp((BGR - 1.2) * 5) * clamp(((ghi / glo) - 5) / 3);
        BGR += (1 - BGR) * frac;
```

In the notch up case, the effect of the operation is ramped down by multiplying DFRAC by a number that is 0 below some value of ghi, 1 above another larger value of ghi, and continuously varying in between the two values. This has the effect of ramping the operation down in areas where the maximum brightness of the edge is nowhere near bright enough to cause a color fringe. Here is the pseudocode for this:

```
        frac = clamp((ghi - 1000) / 1000);
        DFRAC * = frac;
```

The operation may also be ramped down for neutral highs. This is to prevent neutral highlights from being lent color from the darker pixels around them. Here is the pseudocode for this:

```
        frac = max(clamp((fabs(hrg - 1.0) - 0.07) * 3), clamp
        ((fabs(hbg - 1.0) - 0.07) *
        3));
        DFRAC *= frac;
```

The operation may also be turned off in areas where IBGR>1.0 and IBGR>IRGR, in other words in blue areas. This prevents white text on blue backgrounds from being affected in visually unsatisfying ways. Here is the pseudocode for this:

```
        if (IBGR > 1 and IRGR < IBGR)
            DFRAC = 0;
```

The operation is ramped back up when two things occur: (1) the high component value is above some threshold; and (2) the contrast ratio between the high value and the low value of a component is greater than 10. This happens for all three components, so there are actually three ways to ramp back up the operation. This handles specular shines and small lights, but avoids processing text, which only has a contrast of 5 or 6 ratio in a typical photograph. Here is the pseudocode for this:

```
        frac = clamp((rhi - 5000) / 2000) * clamp(((rhi / rlo) - 10) / 3);
        DFRAC += (1 - DFRAC) * frac;
        frac = clamp((ghi - 5000) / 2000) * clamp(((ghi / glo) - 10) /
        3);
        DFRAC += (1 - DFRAC) * frac;
        frac = clamp((bhi - 5000) / 2000) * clamp(((bhi / blo) - 10) /
        3);
        DFRAC += (1 - DFRAC) * frac;
```

Notch Down Case

The notch down case consists of a central set of pixels that are low and periphery pixels that are high. In this edge case, only the low pixels (i.e., those at locations from edge1 up to and including edge2) may be processed. If the center pixel (index 5) is outside that range, then it is entirely unaffected by this edge case. The pseudocode for this is as follows:

```
        if (edge1 > 5 or edge2 < 5)
            leave the pixel unaffected;
```

The average of the red-green and blue-green ratios for all high pixels in the neighborhood is then computed and stored into variables ORGR and OBGR. RGR and BGR are then computed by desaturating ORGR and OBGR by a variable amount. The ORGR and OBGR values may be desaturated by moving them towards 1.0. The amount of desaturation may be 0.5 at edge1 and edge2, and 0.75 in between the two. The pseudocode for this is as follows:

```
        rsum = bsum = 0; count = 0;
        for (i =1 up to and including edge1-1)
        {
            rsum += rgr[i];
            bsum += bgr[i];
            count++;
        }
        for (i = edge2+1 up to and including 9)
        {
            rsum += rgr[i];
            bsum += bgr[i];
            count++;
        }
        if (count == 0)
            leave the pixel unaffected;
        ORGR = rsum / count;
        OBGR = bsum / count;
        if (edge1 == 5 or edge2 == 5)
            desat = 0.5;
        else
            desat = 0.75;
        RGR = ORGR + (1.0 - ORGR) * desat;
        BGR = OBGR + (1.0 - OBGR) * desat;
```

In the notch down case, the effect of the operation may be ramped down in areas where the green contrast ratio is less than 6.5. This prevents the algorithm from introducing color into thin colored text on white backgrounds, but still affects very high-contrast areas. The pseudocode for this is as follows:

$$DFRAC^* = \text{clamp}((ghi/glo) - 6.5);$$

Clear Edge Down Case

In the clear edge cases, only the three low pixels right next to and including the edge are processed. Therefore, only pixels in the affected region are processed, i.e., locations edge1 up to and including edge1+2. Any pixels at locations not in the affected region are left alone. The pseudocode for this is as follows:

```
if (edge1 > 5 or edge2 < 3)
    leave the pixel unaffected;
```

The average of the red-green ratios of the colors at indexes edge1+3 up to and including 9 are computed into ORGR and OBGR. A fraction is evaluated that is 0.75 at edge1, 0.5 at edge1+1, and 0.25 at edge1+2. Then, that fraction is used to interpolate between ORGR and HRG and between OBRG and HBG to create RGR and BGR, respectively. The pseudocode for this is as follows:

```
rsum = bsum = 0; count = 0;
for (i = edge1+3 up to and including 9)
{
    rsum += rgr[i];
    bsum += bgr[i];
    count++;
}
if (count == 0)
    leave the pixel unaffected;
ORGR = rsum / count;
OBGR = bsum / count;
frac = (edge - 2) / 4;
RGR = ORGR + (HRG - ORGR) * frac;
BGR = OBGR + (HBG - OBGR) * frac;
```

In this particular embodiment, no ramp-down occurs for this edge case.

Clear Edge Up Case

In the clear edge cases, only the three low pixels right next to and including the edge are processed. Therefore, only pixels in the affected region are processed, i.e., locations edge1−2 up to and including edge1. Any pixels at locations not in the affected region are left alone. The pseudocode for this is as follows:

```
if (edge1 < 5 or edge2 > 7)
    leave the pixel unaffected;
```

The average of the red-green ratios of the colors at indexes 1 up to and including edge1−3 are computed into ORGR and OBGR. A fraction is evaluated that is 0.25 at edge1−2, 0.5 at edge1−1, and 0.75 at edge1. Then, that fraction is used to interpolate between ORGR and HRG and between OBRG and HBG to create RGR and BGR, respectively. The pseudocode for this is as follows:

```
rsum = bsum = 0; count = 0;
for (i = 1 up to and including edge1−3)
{
    rsum += rgr[i];
    bsum += bgr[i];
    count++;
}
if (count == 0)
    leave the pixel unaffected;
ORGR = rsum / count;
OBGR = bsum / count;
frac = (8 − edge) / 4;
RGR = ORGR + (HRG − ORGR) * frac;
BGR = OBGR + (HBG − OBGR) * frac;
```

In this particular embodiment, no ramp-down occurs for this edge case.

Evaluating the New Color

The center pixel (i.e., the pixel located at index 5 in the neighborhood) may be defined to have color values: rc, gc, and bc. New color values for the center pixel, rn, gn, and bn, are then evaluated in this way:

```
rn = rc * RGR;
gn = gc; and
bn = bc * BGR.
```

The operation may then be scaled back using the DFRAC value:

```
rn = rc + (rn − rc) * DFRAC; and
bn = bc + (bn − bc) * DFRAC.
```

Normalizing the New Color to the Existing Luminance

First, luminance values for the original and new colors are evaluated:

```
iY = rc * 0.299 + gc * 0.587 + bc * 0.114;
Y  = rn * 0.299 + gn * 0.587 + bn * 0.114;
```

Then, a factor is evaluated that allows the new color's luminance to be scaled back to the original color's luminance by some degree. Here, epsilon is the smallest legal value that is non-zero. The pseudocode for this is as follows:

```
epsilon = 1;
factor = iY / max(Y, epsilon)
```

If the factor is greater than 8, the operation is considered to be creating an unlikely result, and so the pixel is left unaffected in such a case. Otherwise, the new color is scaled and we have the final color for output. The pseudocode for this is as follows:

```
If (factor > 8)
    leave the pixel unaffected;
rn = rn * factor;
gn = gn * factor;
bn = bn * factor;
```

Figure 9:
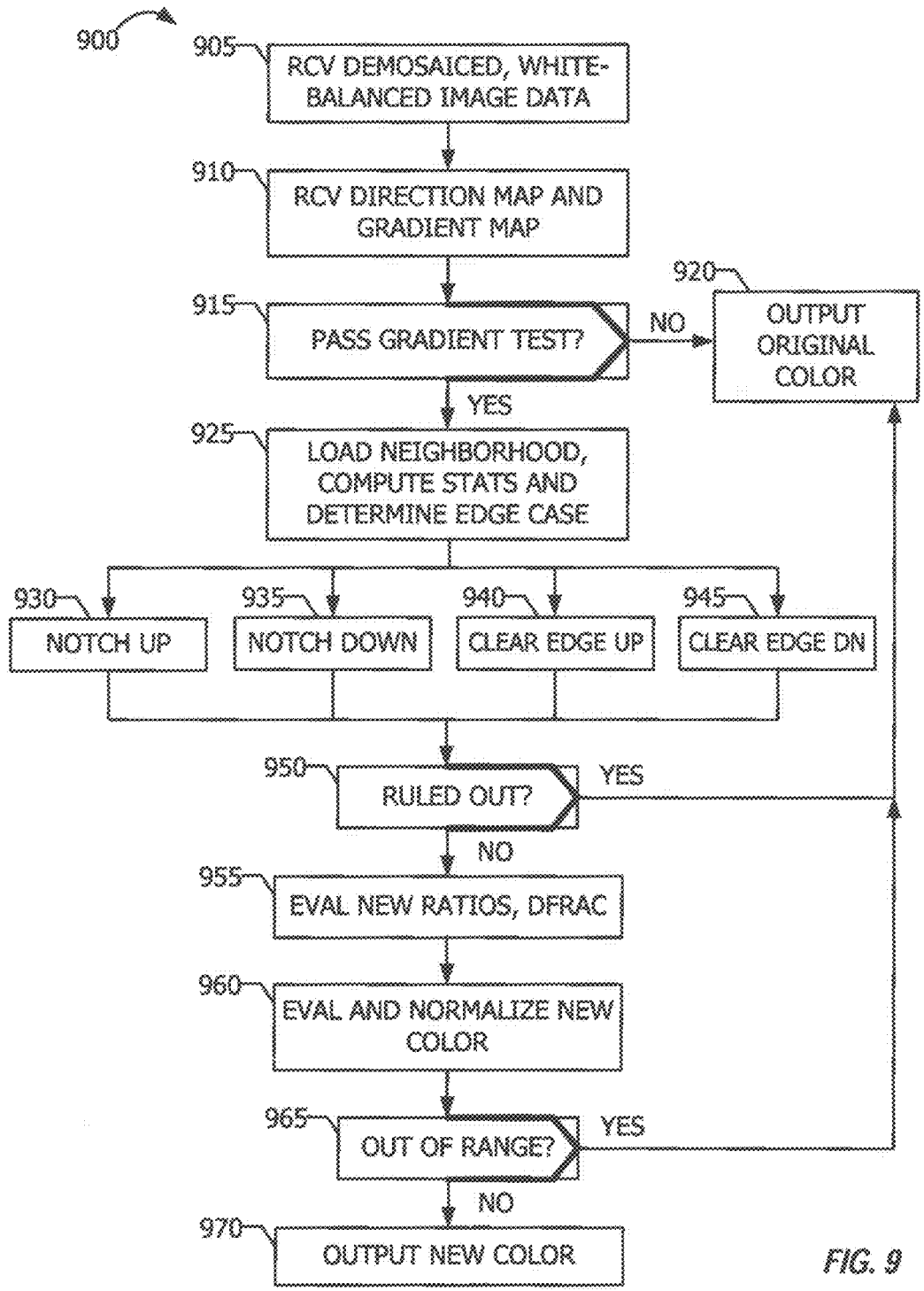
FIG. 9 is a flowchart of an exemplary process for performing color defringing, in accordance with one embodiment.

FIG. 9 shows, in flowchart form, an overview of the steps of the defringing algorithm 900 described above. As was described in greater detail above, the process 900 may begin with the algorithm receiving demosaiced, white-balanced image data (Step 905). Next, the process 900 may receive the computed direction map and gradient map for the image (Step 910). Next, the gradient test is applied to each pixel (Step 915). If the pixel does not pass the gradient test, the pixel is left alone, and the original color of the pixel is output (Step 920). If instead, the pixel does pass the gradient test, the process 900 will load the pixel neighborhood (described above as the 9-pixel neighborhood, N), computer the relevant color statistics, and resolve the pixel to be in one of the predetermined edge cases (Step 925). For example, in some embodiments, each pixel may fall into one of four "edge cases": "notch up" (Step 930); "notch down" (Step 935); "clear edge up" (Step 940); and "clear edge down" (Step 945). Each edge case has its own unique processing, as described in greater detail above. In many edge cases, an initial test is applied to the pixel to determine if it may safely be "ruled out" from further processing (Step 950). If the pixel is ruled out from further processing, the pixel is left alone, and the original color of the pixel is output (Step 920). If instead, the pixel is not ruled out, the process 900 will evaluated new color ratios and a new value of DFRAC, as described in greater detail above (Step 955). Finally, the new color and luminance value for the pixel will be evaluated and normalized (Step 960). Again, if the normalized luminance value of the pixel is outside of a predetermined threshold range, the pixel is left alone, and the original color of the pixel is output (Step 920). If instead, the pixel is not outside of the predetermined threshold range, the process 900 will output the newly calculated color values for the pixel (Step 970). It should be noted that the Steps 915 through 970 may be repeated for each pixel in the image, if so desired.

Figure 10:
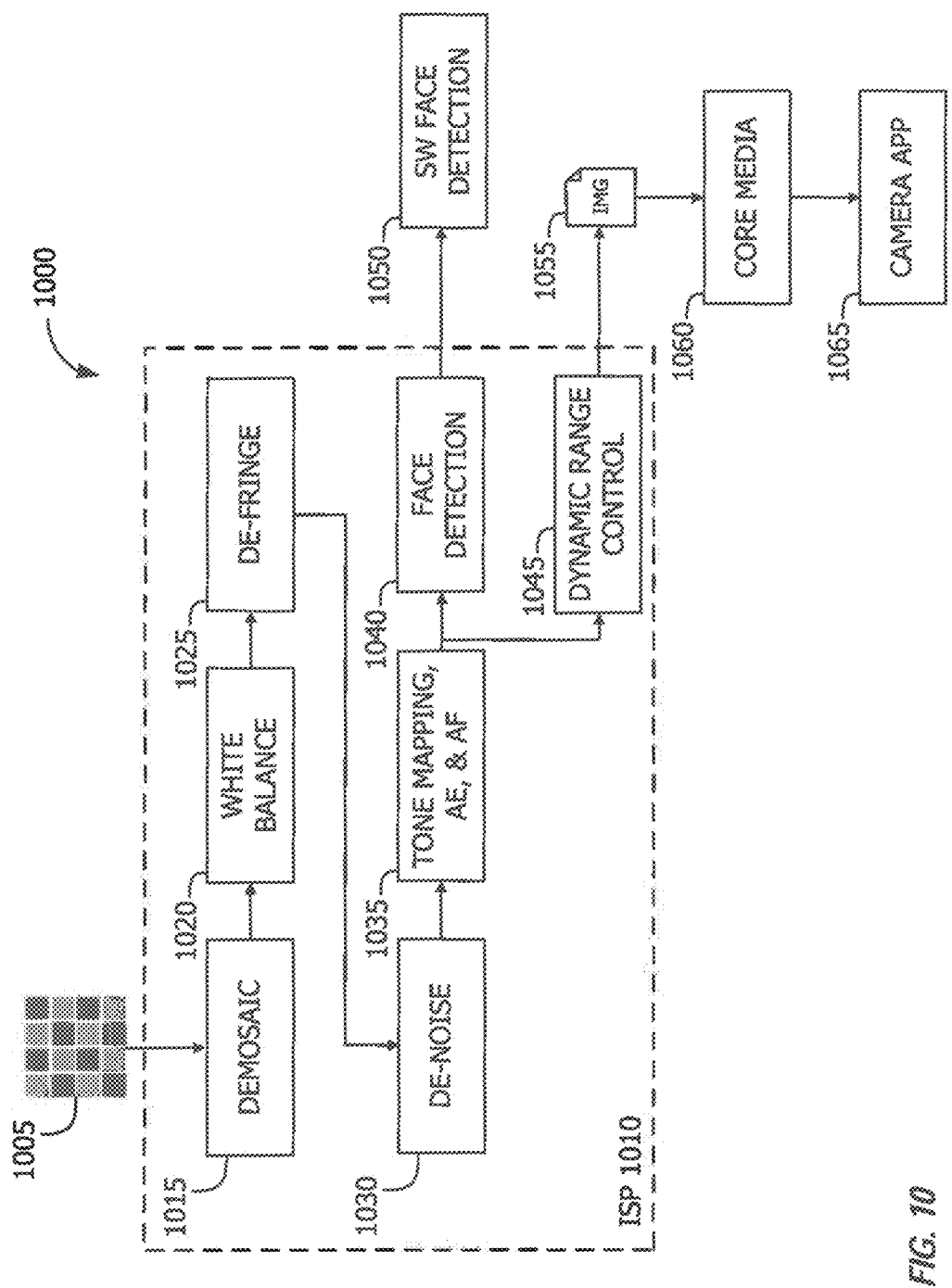
FIG. 10 is a block diagram depicting an exemplary image sensor package (ISP) for performing a color defringing process, in accordance with one embodiment.

FIG. 10 is a block diagram 1000 depicting an exemplary image sensor package (ISP) 1010 for performing a color defringing process, in accordance with one embodiment. First, image sensor data is captured in mosaic form, e.g., as shown by Bayer CFA sample 1005. This data may then be passed to ISP 1010 for various preprocessing steps, such as demosaicing (1015) and white balancing (1020). At that point, a defringing process (1025), such as the exemplary defringing algorithm described above, may be applied to the image data. The defringed image data may then be processed further in a variety a ways, such as de-noising (1030), tone mapping, auto exposure correction, and auto focus correction (1035), face detection (1040) and dynamic range control (1045). Face detection may also work in conjunction with further face detection processing implemented in software (1050). When the ISP 1010 has completed its processing, image 1055 is output and may be provided to other client applications, such as, e.g., Core Media Framework (1060) or a suitable camera application (1065). It should be noted that the particular processing modules shown in ISP 1010 are merely exemplary, and that other processes, or the same processes performed in a different order, may also be implemented in other exemplary ISP's programmed to perform the color defringing process described herein. Moreover, the defringing process (1025) may be implemented in hardware alone, software alone, or a combination thereof. The defringing process may be implemented in, e.g., a desktop or laptop computer or a mobile personal electronic device.

Red-Blue Reconstruction

As mentioned above, in many CFAs, there are more green pixels than red or blue pixels. This means that the green channel has the highest-resolution detail. Correspondingly, the red and blue channels each have less detail. Therefore, during demosaicing, it is common to reconstruct the green channel before reconstructing the red and blue channels. This gives the image processing system an opportunity to pick up some of the detail from the green channel and "deposit it" back into the reconstructed red and blue channels. In fact, because the red and blue channels typically have a lower spatial resolution, they naturally have a softer edge than does the green channel. This creates color fringe, too, so it is beneficial in a color defringing process to utilize the greater level of detail present in the green channel when reconstructing the red and blue channels—if for no other reason than to attempt to limit the color fringe. In some embodiments, the red-blue reconstruction process may occur as the last part of the demosaicing process, as shown in Block 1015 of FIG. 10.

In green channel reconstruction, it is impossible to achieve full detail at each photosite without using the actual values of the red and blue pixels (see, e.g., FIGS. 5A and 5B), which give the only indication of the photometric response at those non-green photosites. This is particularly true in neutral areas. In red-blue reconstruction, it is beneficial to first ascertain the local relationship between the green channel and either the red channel or the blue channel.

Red-blue reconstruction according to one embodiment may utilize four fully-populated images: 1) the CFA-ordered RAW bitmap; 2) the reconstructed green channel; 3) the direction map (as described in the '091 Publication); and 4) the gradient map (as described above). The task of red-blue reconstruction involves coming up with the value of red at each non-red photosite and similarly coming up with the value of blue at each non-blue photosite. Red and blue are symmetric for the purposes of this discussion, and red-blue reconstruction can be accomplished in the same way for either channel, so the discussion here will focus on the red channel (with the understanding that essentially the same methods can be applied to the blue channel to achieve the reconstruction of the blue channel).

Because the red pixels in the CFA-ordered RAW bitmap are sparse, this operation essentially amounts to performing various interpolation operations. To interpolate, three different methods of producing the red value may be employed: 1) dumb interpolation; 2) linear regression; and 3) directional interpolation.

The dumb interpolation method comprises finding the surrounding red pixels and linearly interpolating between them. This method is "soft" because the red channel is actually lower resolution than the green channel. However, it is certainly good enough for flat areas of color because it correctly maintains the red level after interpolation. It may also be necessary to use the dumb interpolation result when another method cannot be used in such a way that it produces a correct result with certainty.

The linear regression method is a technique in which red samples in the area are correlated with their co-located green samples to produce a linear relation in which red can be expressed in the following way:

$$red = A + B * green.$$

The value of this technique becomes clear when it is understood that, in neutral areas, red and green are strongly correlated with a linear relationship. It is also true that, for some edges, red and green can be correlated by an inverse linear relationship (for instance on a red-blue edge). The linear regression method can still predict the correct red value at such an edge. A basic assumption to using the linear regression technique to reconstruct red is the requirement that, locally, red and green may be described by a duotone color space. This means that, across an edge, the colors used to describe that edge lie on a line in red-green color space. It is not always possible to do this because it amounts to resolving two-dimensional color to one-dimensional color.

The directional interpolation method uses the direction map to select the red samples that may be used to interpolate the intermediate red value. But, due to the topology and geometric relationship of the various color cells in the CFA, not all directions are available for interpolation at each photosite. For example, as shown in the Bayer CFA 505 of FIG. 5A, at a green pixel, if the predominant edge direction is on a diagonal, then a red or blue pixel cannot be directionally interpolated because there are no reds or blues on that diagonal. At a blue pixel, red cannot be directionally interpolated horizontally or vertically, because there are no reds on those rows and columns respectively. Nearly every CFA, including the Fuji X-trans CFA (shown at element 550 in FIG. 5B), has this or a similar problem.

While, in the Bayer pattern, the maximum gap between red pixels is two pixels, in some patterns the maximum gap is larger. In the case of a Fuji X-trans CFA, for example, the gap can be as large as six pixels (see FIG. 5B). This makes directional interpolation more prone to potential errors because high-frequency detail could exist between the wide interpolation baseline, causing an incorrect red or blue sample to be generated.

The Red-Blue Reconstruction Algorithm

To reconstruct red and blue, each pixel of the image is iterated over. For each pixel, a starting approximation to the red, green, and blue values is computed at the pixel using dumb interpolation and actual sample values that are present at the pixel. These values are stored in variables that will be referred to herein as: dr, dg, and db. Then, the values g and d are loaded from the gradient and direction maps. If the gradient g is less than or equal to a given threshold, GT, then the starting values are simply output. If the gradient g is greater than GT, then the reconstruction algorithm must specifically evaluate more accurate red and blue values, but only for those photosites that are not actually red or blue already. Here is pseudocode for the red-blue reconstruction algorithm:

```
for (each pixel P)
{
    s = sample from RAW CFA-ordered bitmap at P;
    if (P is a red photosite)
        dr = s;
    else
        dr = dumbly interpolated red at P;
    dg = sample from reconstructed green at P;
    if (P is a blue photosite)
        db = s;
    else
        db = dumbly interpolated blue at P;
    g = gradient map value at P;
    d = direction map value at P;
    fr = dr;
    fg = dg;
    fb = db;
    if (g > GT)
    {
        if (p is not a red photosite)
            reconstruct red at P;
        if (p is not a blue photosite)
            reconstruct blue at P;
    }
    output fr, fg, and fb;
}
```

To reconstruct red at a non-red photosite P, the dumb interpolation version of red, dr, is used as a starting value. Then, the reconstruction algorithm may compute the linear regression between the local red samples (i.e., all red photosites within a given radius of P) and their co-located green samples (i.e., samples that are taken from the green channel reconstruction data). If the linear regression is valid (the evaluation of the validity of the linear regression technique will be described in greater detail below), then it produces values A and B such that we can predict red from green using:

red=$A+B*$green.

The reconstruction algorithm then checks the rpre value using the reconstructed green channel to see if the local area is "well-behaved," e.g., in some embodiments, the green channel may be characterized as well behaved if the dumb-interpolated green value for the sample is less than a threshold percentage outside the range of local dumb-interpolated green values. If the local green channel is well-behaved and rpre does not behave similarly when compared with local reds, then the reconstruction algorithm may instead use the dumb interpolated red value, dr, for rpre. Here is pseudocode for the reconstruction of a red pixel at P. In the pseudocode, the value fr is used as the output red:

```
compute the linear regression between local red samples and co-located
reconstructed green samples;
    if (the linear regression is valid)
    {
        evaluate rpre from the linear regression A and B terms and dg;
        let DRs be the red pixels used in dumb interpolation at P;
        at the DRs, find co-located greens DGs;
        compute glo and ghi, the minimum and maximum values in DGs;
        if (dg is less than 20% outside the range glo...ghi of DGs)
        {
            compute rlo and rhi, the minimum and maximum values of DRs;
            if (rpre is more than 20% outside the range rlo...rhi of DRs)
                rpre =dr;
        }
        fr = rpre;
        if (red can be interpolated along direction d at P)
        {
            let R1 and R2 be the two red pixels used in direction d
            interpolation of
red at P;
            evaluate ipre, using the linear combination of R1 and R2;
            if (R1*2 < R2 or R1 > R2*2)
                ipre = dr;
        }
        else
            ipre = dr;
        if (ipre is noticeably different from rpre and P is not in a neutral area)
            fr = ipre;
}
```

The blue channel may be reconstructed in an identical manner. In the pseudocode, the value fb is used as the output blue:

```
compute the linear regression between local glue samples and co-located
reconstructed green samples;
    if (the linear regression is valid)
    {
        evaluate rpre from the linear regression A and B terms and dg;
        let DBs be the blue pixels used in dumb interpolation at P;
        at the DBs, find co-located greens DGs;
        compute glo and ghi, the minimum and maximum values in DGs;
        if (dg is less than 20% outside the range glo...ghi of DGs)
        {
            compute blo and bhi, the minimum and maximum values of DBs;
            if (rpre is more than 20% outside the range blo...bhi of DBs)
                rpre = db;
        }
        fb = rpre;
        if (blue can be interpolated along direction d at P)
        {
            let B1 and B2 be the two red pixels used in direction d
```

```
        interpolation of
red at P;
        evaluate ipre, using the linear combination of B1 and B2;
        if (B1*2 < B2 or B1 > B2*2)
            ipre = db;
        }
        else
            ipre = db;
        if (ipre is noticeably different from rpre and P is not in a neutral area)
            fb = ipre;
}
```

The Linear Regression Technique

To compute the linear regression between local red values and local green values, the reconstruction algorithm may enumerate all the red photosites within a given radius, R, from pixel P. The reconstruction algorithm may iterate over each such photosite. The reconstruction algorithm may only consider those red photosites within the neighborhood having a gradient value at that photosite that exceeds the gradient threshold, GT. This means the reconstruction algorithm only includes the red pixels in the linear regression that are actually sufficiently near an edge.

For any qualified red pixel r, the reconstruction algorithm may also examine rg, the co-located green sample. Over all the qualified red pixels, the reconstruction algorithm may compute the sum of the red pixel values, rs, the sum of the co-located green values, gs, the sum of the product between r and rg, rgs, and the sum of the square of the green value rg, ggs. These four sums are used to compute the linear regression.

If n is defined as the number of qualified red pixels, then the linear regression is considered to be "valid" if n is greater than or equal to 4. Thus, the reconstruction algorithm may evaluate the linear regression in the following way:

```
            rm = rs / n;
            gm = gs / n;
            ssxy = rgs − gs * rm;
            ssxx = ggs − gs * gm;
            b = ssxy / ssxx;
            a = rm − b * gm;
```

In some embodiments, the linear regression is also considered invalid if ssxx is zero.

Figure 11:
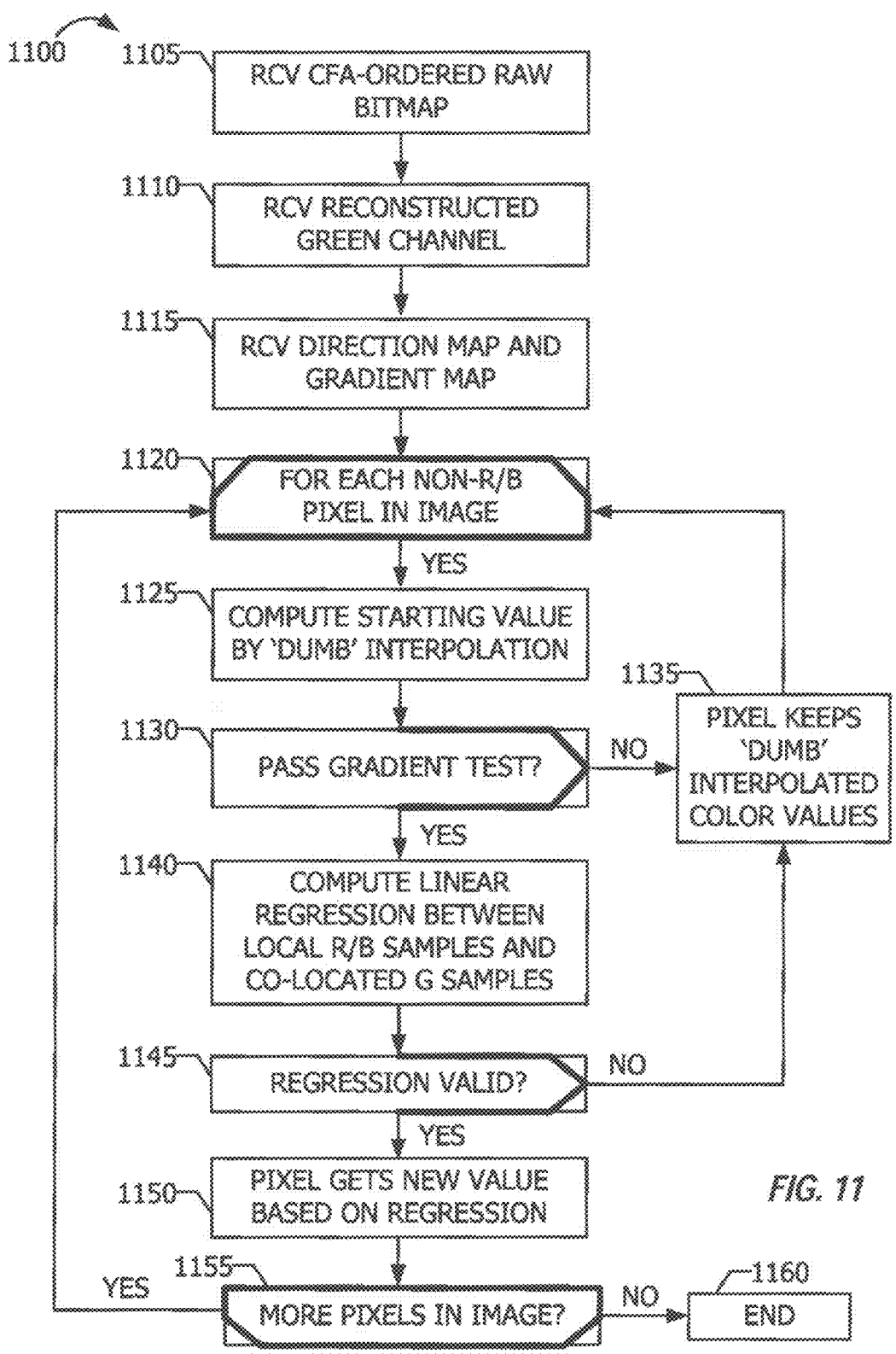
FIG. 11 is a flowchart of an exemplary process for performing red-blue color map reconstruction, in accordance with one embodiment.

FIG. 11 is a flowchart 1100 of an exemplary process for performing red-blue color map reconstruction, in accordance with one embodiment, and as described in greater detail above. As was described in greater detail above, the process 1100 may begin with the algorithm receiving CFA-ordered, RAW image data (Step 1105). Next, the process 1100 may receive the reconstructed green channel for the image (Step 1110). Next, the process 1100 may receive the computed direction map and gradient map for the image (Step 1115). Once this information has been computed and received by the reconstruction process, the following processing may take place for each non-red pixel (in the case of red reconstruction) or non-blue pixel (in the case of blue reconstruction) (Step 1120): First the process 1100 may compute the starting value for the pixel via the "dumb" interpolation methods as discussed above (Step 1125). Next, the gradient test is applied to each pixel (Step 1130). If the pixel does not pass the gradient test, then the dumb-interpolated color of the pixel gets output (Step 1135). If instead, the pixel does pass the gradient test, the process 1100 will compute the linear regression between the local red (or blue) samples and the co-located green samples, as is described in greater detail above (Step 1140). Next, the validity of the regression is assessed at Step 1145. If the regression is not valid, then the dumb-interpolated color of the pixel gets output (Step 1135). If instead, the pixel does pass the regression validity test, a new value for the pixel is computed, as is described in greater detail above under the heading "The red-blue reconstruction algorithm" (Step 1150). This processing continues until there are no further pixels left in the image to process (Step 1155), at which time the process may end (Step 1160), and the reconstructed channel information may be passed on to other processes that would benefit from utilizing it, e.g., the color defringing process described herein.

Figure 12:
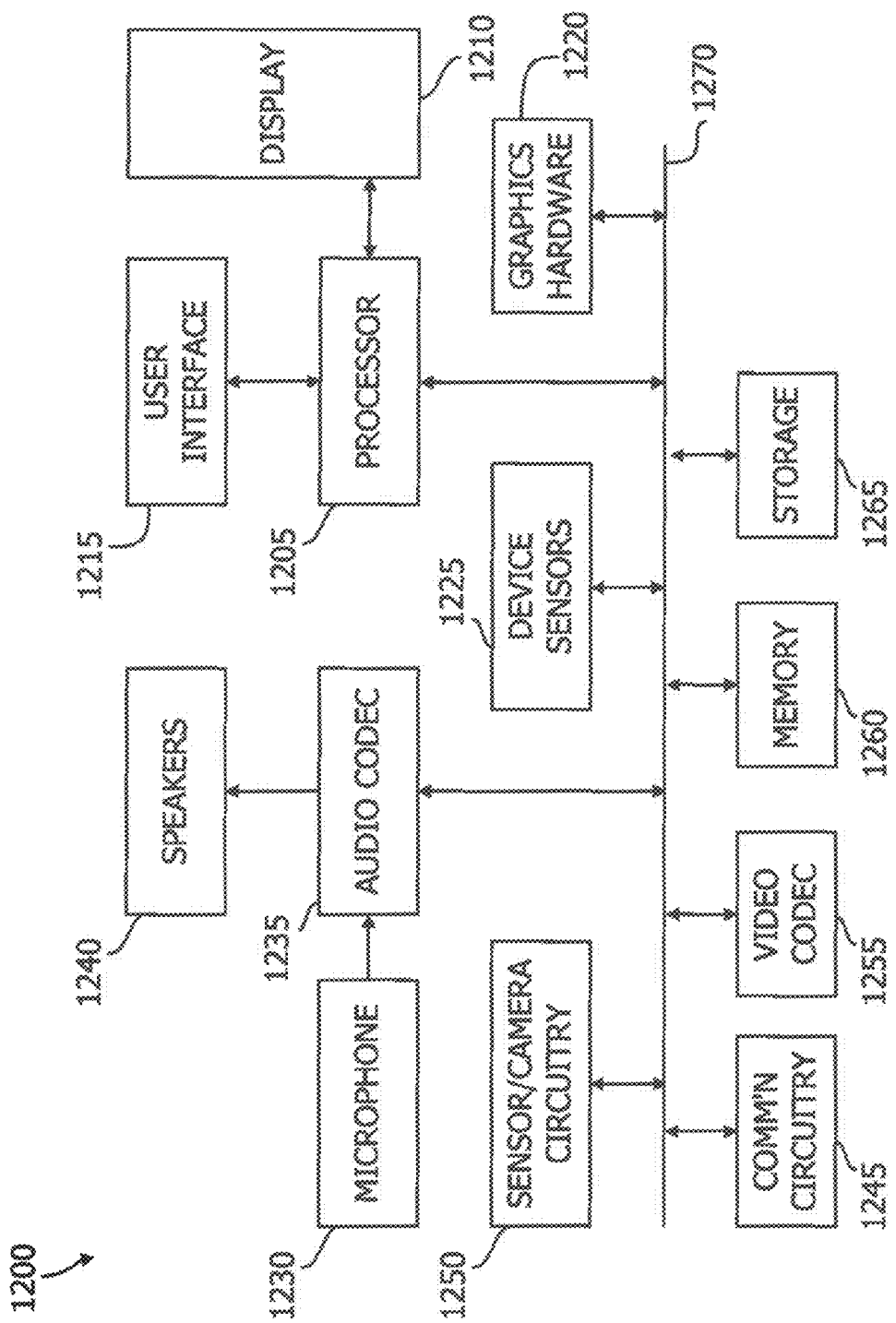
FIG. 12 is a block diagram of an illustrative electronic device, in accordance with one embodiment.

Referring now to FIG. 12, a simplified functional block diagram of illustrative electronic device 1200 is shown according to one embodiment. Electronic device 1200 may include processor 1205, display 1210, user interface 1215, graphics hardware 1220, device sensors 1225 (e.g., proximity sensor/ambient light sensor, accelerometer and/or gyroscope), microphone 1230, audio codec(s) 1235, speaker(s) 1240, communications circuitry 1245, digital image capture unit 1250, video codec(s) 1255, memory 1260, storage 1265, and communications bus 1270. Electronic device 1200 may be, for example, a personal digital assistant (PDA), personal music player, mobile telephone, notebook, laptop or tablet computer, desktop computer, or server computer. More particularly, the operations described above may be performed on a device that takes the form of device 1200.

Processor 1205 may execute instructions necessary to carry out or control the operation of many functions performed by device 1200. Processor 1205 may, for instance, drive display 1210 and receive user input from user interface 1215. User interface 1215 can take a variety of forms, such as a button, keypad, dial, a click wheel, keyboard, display screen and/or a touch screen. Processor 1205 may also, for example, be a system-on-chip such as those found in mobile devices and include a dedicated graphics processing unit (GPU). Processor 1205 may be based on reduced instruction-set computer (RISC) or complex instruction-set computer (CISC) architectures or any other suitable architecture and may include one or more processing cores. Graphics hardware 1220 may be special purpose computational hardware for processing graphics and/or assisting processor 1205 to process graphics information. In one embodiment, graphics hardware 1220 may include a programmable graphics processing unit (GPU).

Sensor and camera circuitry 1250 may capture still and video images that may be processed, at least in part, by video codec(s) 1255 and/or processor 1205 and/or graphics hardware 1220, and/or a dedicated image processing unit incorporated within circuitry 1250. Images so captured may be stored in memory 1260 and/or storage 1265. Memory 1260 may include one or more different types of media used by processor 1205 and graphics hardware 1220 to perform device functions. For example, memory 1260 may include memory cache, read-only memory (ROM), and/or random access memory (RAM). Storage 1265 may store media (e.g., audio, image and video files), computer program instructions or software, preference information, device profile information, and any other suitable data. Storage 1265 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read- Only Memory (EEPROM). Memory 1260 and storage 1265 may be used to tangibly retain computer program instructions or code organized into one or more modules and written in any desired computer programming language. When executed by, for example, processor 1205 such computer program code may implement one or more of the methods described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising instructions stored thereon to cause the processor to:
    obtain image data representative of a first image, the image data comprising a plurality of pixels, each pixel in the plurality comprising a first plurality of color values;
    obtain a direction map for the first image, the direction map having a corresponding value for each pixel in the plurality;
    obtain a gradient map for the first image, the gradient map having a corresponding value for each pixel in the plurality;
    determine color statistics for one or more pixels in the plurality, wherein the instructions to cause the processor to determine the color statistics comprise instructions to cause the processor to analyze a color value for each pixel in a neighborhood of pixels surrounding each of the one or more pixels for which the color statistics are being determined;
    determine a direction-agnostic case classification for the one or more pixels in the plurality, wherein the instructions to cause the processor to determine the direction-agnostic edge case classification comprise instructions to cause the processor to analyze a brightness value for each of the one or more pixels for which the direction-agnostic edge case classification is being determined relative to the brightness values of the other pixels in the neighborhood of pixels surrounding each of the one or more pixels for which the edge case is being classified; and
    update the first plurality of color values for one or more pixels in the plurality, based at least in part on: the corresponding value in the direction map, the corresponding value in the gradient map, the first plurality of color values, the determined color statistics for the pixel being updated, and the direction-agnostic edge case classification for the pixel being updated.

2. The non-transitory program storage device of claim 1, wherein the corresponding values in the direction map comprise a representation of at least one of the following directions: horizontal, rising diagonal, vertical, and falling diagonal.

3. The non-transitory program storage device of claim 1, wherein the gradient map is determined from reconstructed green color channel information for the first image.

4. The non-transitory program storage device of claim 1, wherein the pixels comprising the neighborhood for a given pixel are determined based, at least in part, on the corresponding value in the direction map for the given pixel.

5. The non-transitory program storage device of claim 4, wherein the pixels comprising the neighborhood for a given pixel are further determined to lie in a direction that is perpendicular to a predominant edge direction of the pixel, wherein the predominant edge direction of the pixel is represented by the corresponding value in the direction map for the given pixel.

6. The non-transitory program storage device of claim 5, wherein the neighborhood comprises a column of Nx1 pixels.

7. The non-transitory program storage device of claim 6, wherein the neighborhood is further determined so that the given pixel is located in the center of the neighborhood.

8. The non-transitory program storage device of claim 1, wherein the color statistics determined for each pixel in the neighborhood of pixels for a given pixel comprise at least one of the following: a red/green ratio, and a blue/green ratio.

9. The non-transitory program storage device of claim 1, wherein the instructions to update the first plurality of color values for one or more pixels in the plurality comprise instructions to determine a normalized luminance value for the one or more pixels in the plurality.

10. The non-transitory program storage device of claim 1, wherein the instructions to update the first plurality of color values for one or more pixels in the plurality comprise instructions to soften the plurality of new color values based, at least in part, on a magnitude of the corresponding value in the gradient map of one or more of the pixels within the neighborhood of pixels for a given pixel.

11. A method of defringing RAW images, comprising:
    obtaining image data representative of a first image, the image data comprising a plurality of pixels, each pixel in the plurality comprising a first plurality of color values;
    obtaining a direction map for the first image, the direction map having a corresponding value for each pixel in the plurality;
    obtaining a gradient map for the first image, the gradient map having a corresponding value for each pixel in the plurality; and
    determining color statistics for one or more pixels in the plurality, wherein determining the color statistics comprises analyzing a color value for each pixel in a neighborhood of pixels surrounding each of the one or more pixels for which the color statistics are being determined;
    determining a direction-agnostic edge case classification for the one or more pixels in the plurality, wherein determining the direction-agnostic edge case classification comprises analyzing a brightness value for each of the one or more pixels for which the direction-agnostic edge case classification is being determined relative to the brightness values of the other pixels in the neighborhood of pixels surrounding each of the one or more pixels for which the edge case is being classified; and
    updating the first plurality of color values for one or more pixels in the plurality, based at least in part on: the corresponding value in the direction map, the corresponding value in the gradient map, the first plurality of color values, the determined color statistics for the pixel being updated, and the direction-agnostic edge case classification for the pixel being updated.

12. The method of claim 11, wherein the corresponding values in the direction map comprise a representation of at least one of the following directions: horizontal, rising diagonal, vertical, and falling diagonal.

13. The method of claim 11, wherein the pixels comprising the neighborhood for a given pixel are determined based, at least in part, on the corresponding value in the direction map for the given pixel.

14. The method of claim 13, wherein the pixels comprising the neighborhood for a given pixel are further determined to lie in a direction that is perpendicular to a predominant edge direction of the pixel, wherein the predominant edge direction of the pixel is represented by the corresponding value in the direction map for the given pixel.

15. The method of claim 11, wherein the color statistics determined for each pixel in the neighborhood of pixels for a given pixel comprise at least one of the following: a red/green ratio, and a blue/green ratio.

16. The method of claim 11, wherein the act of updating the first plurality of color values for one or more pixels in the plurality comprises determining a normalized luminance value for the one or more pixels in the plurality.

17. The method of claim 11, wherein the act of updating the first plurality of color values for one or more pixels in the plurality comprises softening the plurality of new color values based, at least in part, on a magnitude of the corresponding value in the gradient map of one or more of the pixels within the neighborhood of pixels for a given pixel.

18. A device, comprising:
a memory;
a display; and
one or more processors operatively coupled to the memory and the display and configured to execute program code stored in the memory to:
obtain image data representative of a first image, the image data comprising a plurality of pixels, each pixel in the plurality comprising a first plurality of color values;
obtain a direction map for the first image, the direction map having a corresponding value for each pixel in the plurality;
obtain a gradient map for the first image, the gradient map having a corresponding value for each pixel in the plurality; and
determine color statistics for one or more pixels in the plurality, wherein determining the color statistics comprises analyzing a color value for each pixel in a neighborhood of pixels surrounding each of the one or more pixels for which the color statistics are being determined;
determine a direction-agnostic edge case classification for the one or more pixels in the plurality, wherein determining the direction-agnostic edge case classification comprises analyzing a brightness value for each of the one or more pixels for which the direction-agnostic edge case classification is being determined relative to the brightness values of the other pixels in the neighborhood of pixels surrounding each of the one or more pixels for which the edge case is being classified; and
update the plurality of color values for one or more pixels in the plurality, based at least in part on: the corresponding value in the direction map, the corresponding value in the gradient map, the first plurality of color values, the determined color statistics for the pixel being updated, and the direction-agnostic edge case classification for the pixel being updated.

19. The device of claim 18, wherein the pixels comprising the neighborhood for a given pixel are determined based, at least in part, on the corresponding value in the direction map for the given pixel.

20. The device of claim 18, wherein the color statistics determined for each pixel in the neighborhood of pixels for a given pixel comprise at least one of the following: a red/green ratio, and a blue/green ratio.

* * * * *